April 8, 1969

D. A. GLENN 3,437,929

AUTOMATICALLY INDEXED PROBE ASSEMBLY FOR TESTING
SEMICONDUCTOR WAFERS AND THE LIKE

Filed Aug. 5, 1965

INVENTOR.
David A. Glenn
BY
Attorneys

INVENTOR.
David A. Glenn
BY
Attorneys

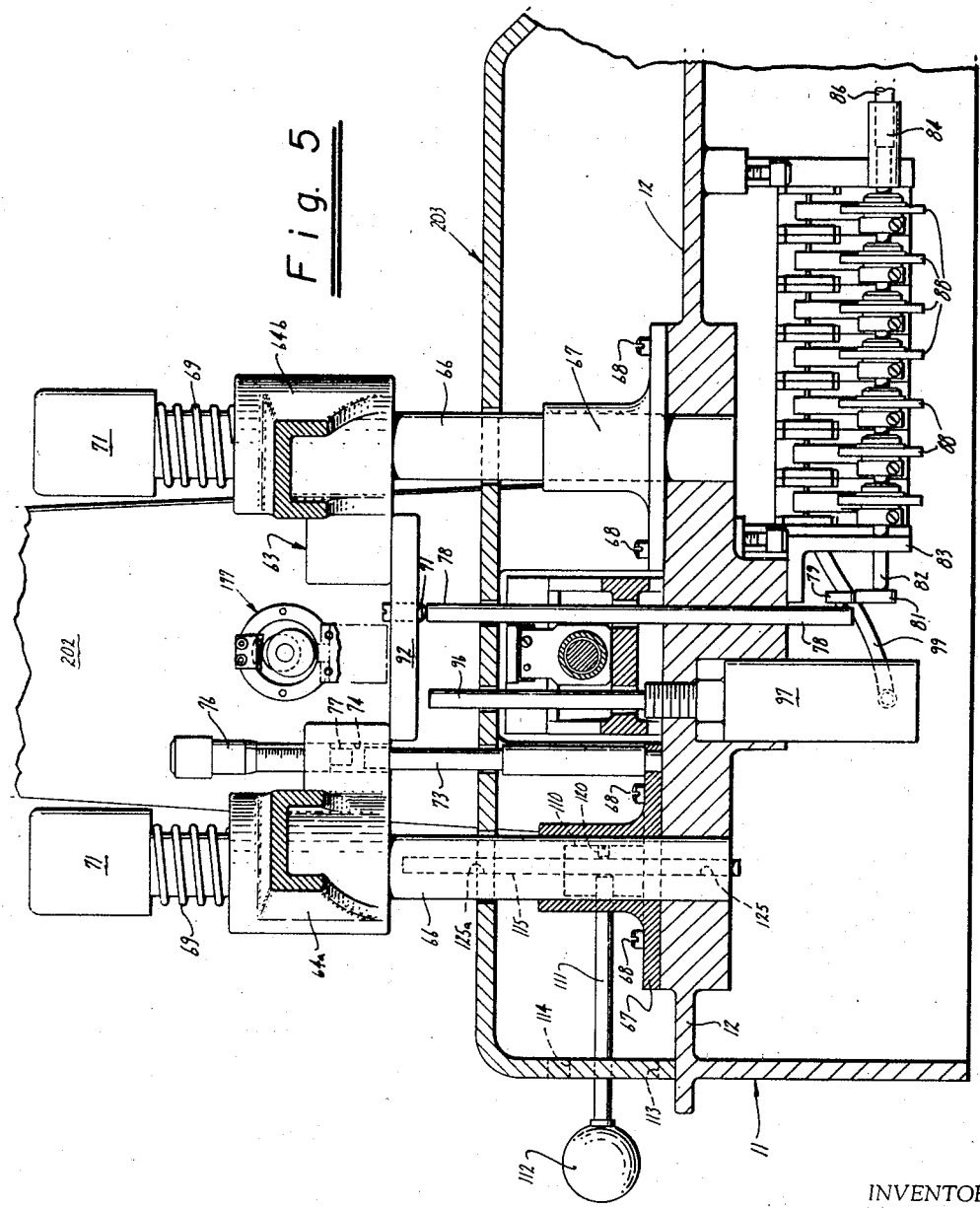

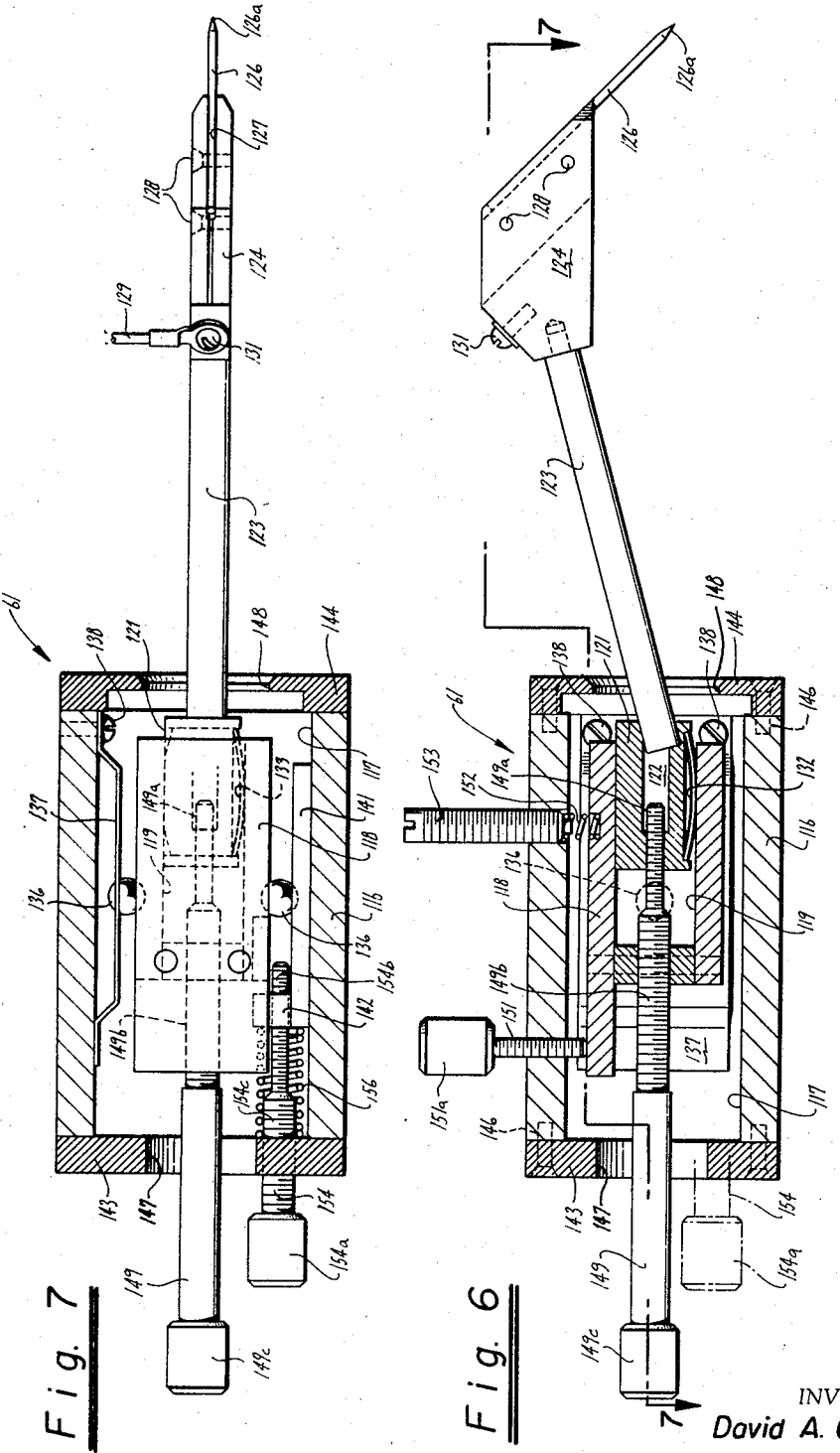

United States Patent Office 3,437,929
Patented Apr. 8, 1969

3,437,929
AUTOMATICALLY INDEXED PROBE ASSEMBLY FOR TESTING SEMICONDUCTOR WAFERS AND THE LIKE
David A. Glenn, Cupertino, Calif., assignor to Electroglas Incorporated, Menlo Park, Calif., a corporation of California
Filed Aug. 5, 1965, Ser. No. 477,427
Int. Cl. G01r 31/02
U.S. Cl. 324—158     19 Claims

ABSTRACT OF THE DISCLOSURE

Wafer die sort machine having a chuck assembly for holding the wafer and a plurality of probes for contacting the wafer and means for automatically causing sequential movement of the chuck assembly and the probes relative to each other for checking the dies to be formed from the wafer.

---

This invention relates to a wafer die sort machine and method, and more particularly to an automatic wafer die sort machine and method.

In the manufacture of semiconductor devices, it is the common practice to deposit a plurality of the semiconductor devices which are very closely spaced on a wafer. In the past, the devices on the wafers have been checked by manually manipulating probes and their points to predetermined positions on the patterns to check the device. Such operations have been found to be very costly and time consuming. There is, therefore, a need for automatic means for sorting and checking the wafers in order to make it possible to decrease the cost of semiconductor manufacture.

In general, it is an object of the present invention to provide an automatic die sort machine and method which makes it possible to automatically sort dies.

Another object of the invention is to provide a machine and method of the above character in which a single operator can control a multiplicity of machines.

Another object of the invention is to provide a machine and method of the above character which does not require all of an operator's time.

Another object of the invention is to provide a machine and method of the above character which sequentially and automatically checks the semiconductor devices on the wafer.

Another object of the invention is to provide a machine and method of the above character in which the time required for loading and unloading wafers has been minimized.

Another object of the invention it to provide a machine and method of the above character in which it is possible to rapidly align the wafer after it has been loaded into the machine.

Another object of the invention is to provide a machine and method of the above character in which it is possible to automatically check a wafer after it has been loaded into the machine without the operator being in attendance.

Another object of the invention is to provide a machine and method of the above character which can be automatically pre-programmed.

Another object of the invention is to provide a machine and method of the above character in which the machine can be pre-programmed to check devices on two axes.

Another object of the invention is to provide a machine and method of the above character in which one row of devices is first checked and then the next row is automatically checked.

Another object of the invention is to provide a machine and method of the above character in which at certain times the probes are stationary with respect to motion of the wafer in a horizontal plane.

Another object of the invention is to provide a machine and method of the above character which can be readily installed and operated.

Another object of the invention is to provide a machine of the above character which can be readily and economically manufactured.

Additional objects and features of the invention will appear from the following description in which the preferred embodiment is set forth in detail in conjunction with the accompanying drawings.

Referring to the drawings:

FIGURE 5 is a cross-sectional view taken along the line 5—5 of FIGURE 4.

FIGURE 6 is a cross-sectional view of one of the probing heads utilized in the machine taken along the line 6—6 of FIGURE 2.

FIGURE 7 is a side elevational view in cross-section taken along the line 7—7 of FIGURE 6.

Figure 1:
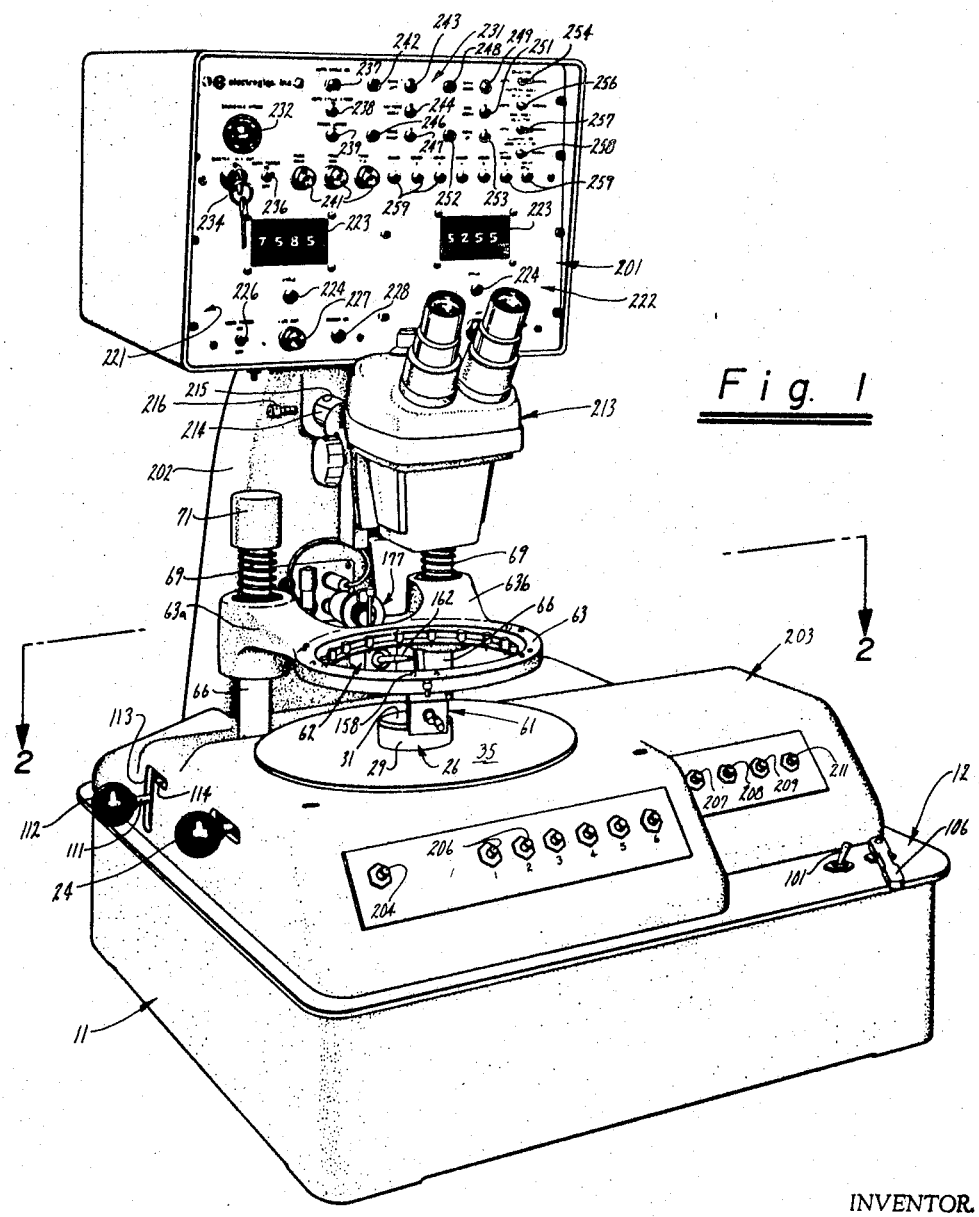
FIGURE 1 is a perspective view of a machine incorporating the present invention.

As shown in the drawings, the automatic wafer die sorting machine consists of a base 11 in the form of a casting which has its lower side open and which is provided with a horizontal top plate 12. A large opening 13 is formed in the top plate 12. A stage assembly 16 of a suitable type such as one supplied by Scherr Tumico of St. James, Minn., is mounted on the top plate 12 upon posts 17 formed as an integral part of the top plate by suitable means, such as screws (not shown). As is well kown to those skilled in the art, the stage assembly 16 includes a bottom plate 18 which is affixed to the post 17 and a movable plate 19 which is slidably mounted on the bottom plate 18 for movement in a direction which may be termed along the "Y" axis, and alternately the vertical axis. Another movable plate 21 is mounted upon the movable plate 19 for movement along the "X" or horizontal axis or, in other words, in a direction at right angles to the direction of movement of the movable plate 19. A top plate 22 is rotatably mounted upon the movable plate 21 for rotation through 360°. A screw 23 forms a part of the stage assembly 16 and is adapted to lock the plate 22 in any desired angular position. The screw 23 is provided with a suitable knob 24 which is accessible from outside the base 11 as shown in FIGURE 1.

A chuck assembly 26 is mounted upon the top plate 22 for rotation therewith and consists of a flanged body 27 which has a bore 28 extending therethrough. A ring 29 of a suitable insulating material, such as a phenolic resin, is mounted on the upper extremity of the body 27. A vacuum chuck plate 31 is mounted on the upper extremity of the ring 29 and, in cooperation with the ring 29 and the flange body 27, forms a vacuum chamber 32 therebelow which is in communication with the bore 28. The chuck plate 31 can be formed of any suitable material as, for example, satin chrome steel which is provided with a plurality of openings (not shown) which communicate with the vacuum chamber 32. Alternatively, the chuck plate 31 can be formed of a suitable material such as porous bronze. A pipe 34 is mounted in the bore 28 and is connected to a suitable source of vacuum as hereinafter described. A cover plate 35 is mounted on the upper part of the body 27.

Figure 2:
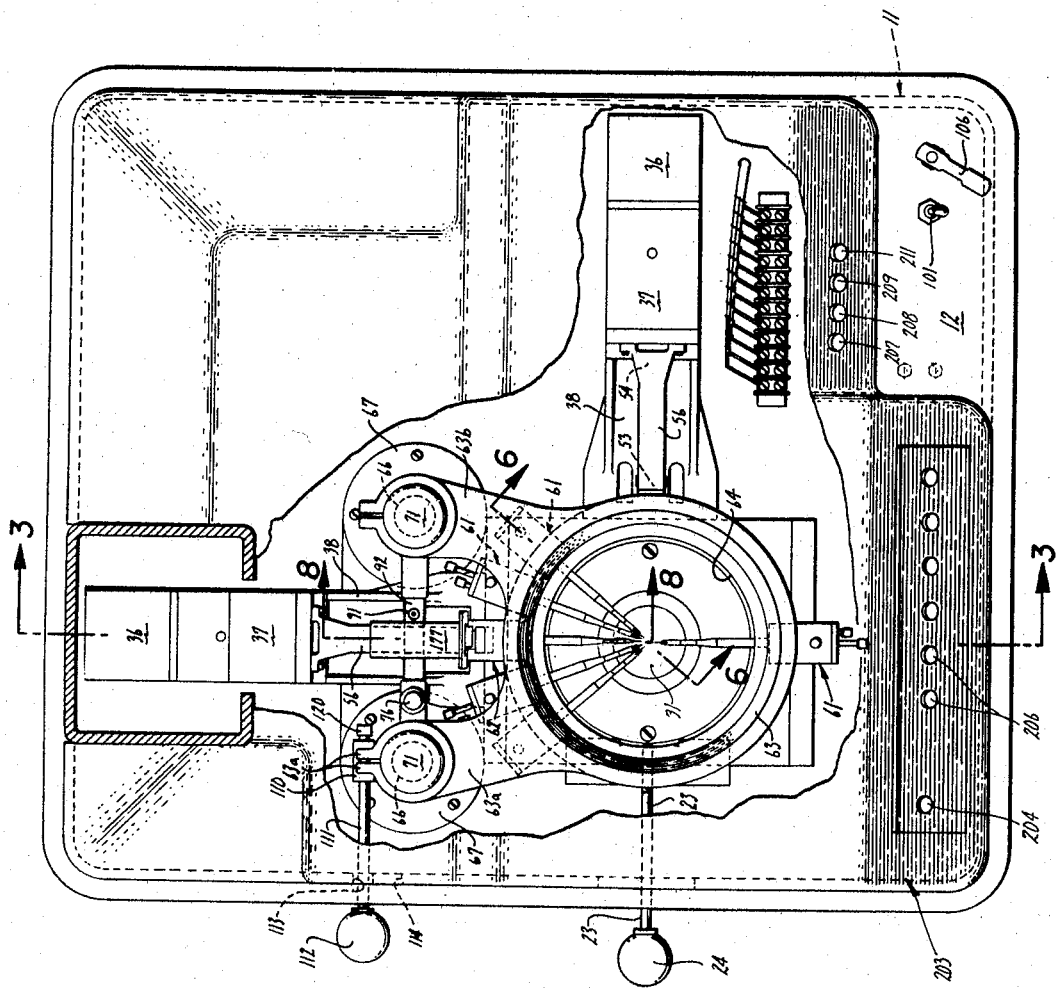
FIGURE 2 is a cross-sectional view in plan taken along the line 2—2 of FIGURE 1.
Figure 3:
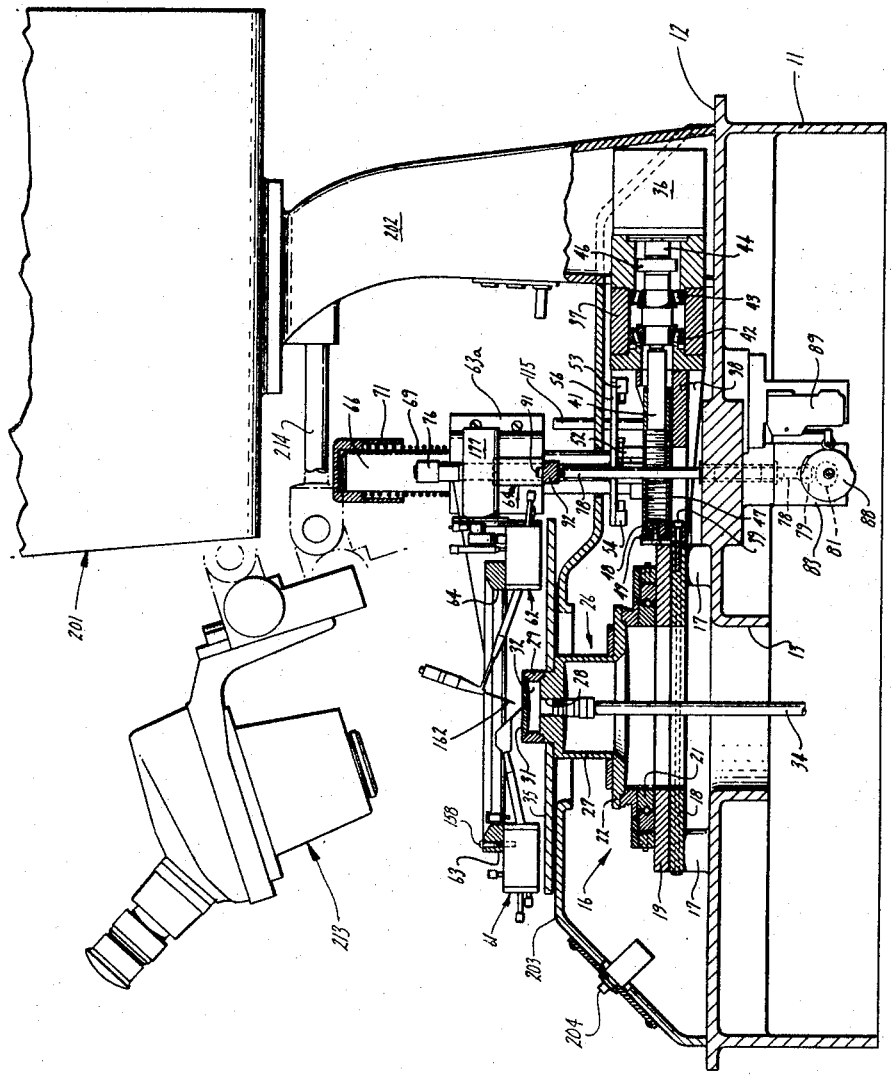
FIGURE 3 is a cross-sectional view in side elevation taken along the line 3—3 of FIGURE 2.
Figure 4:
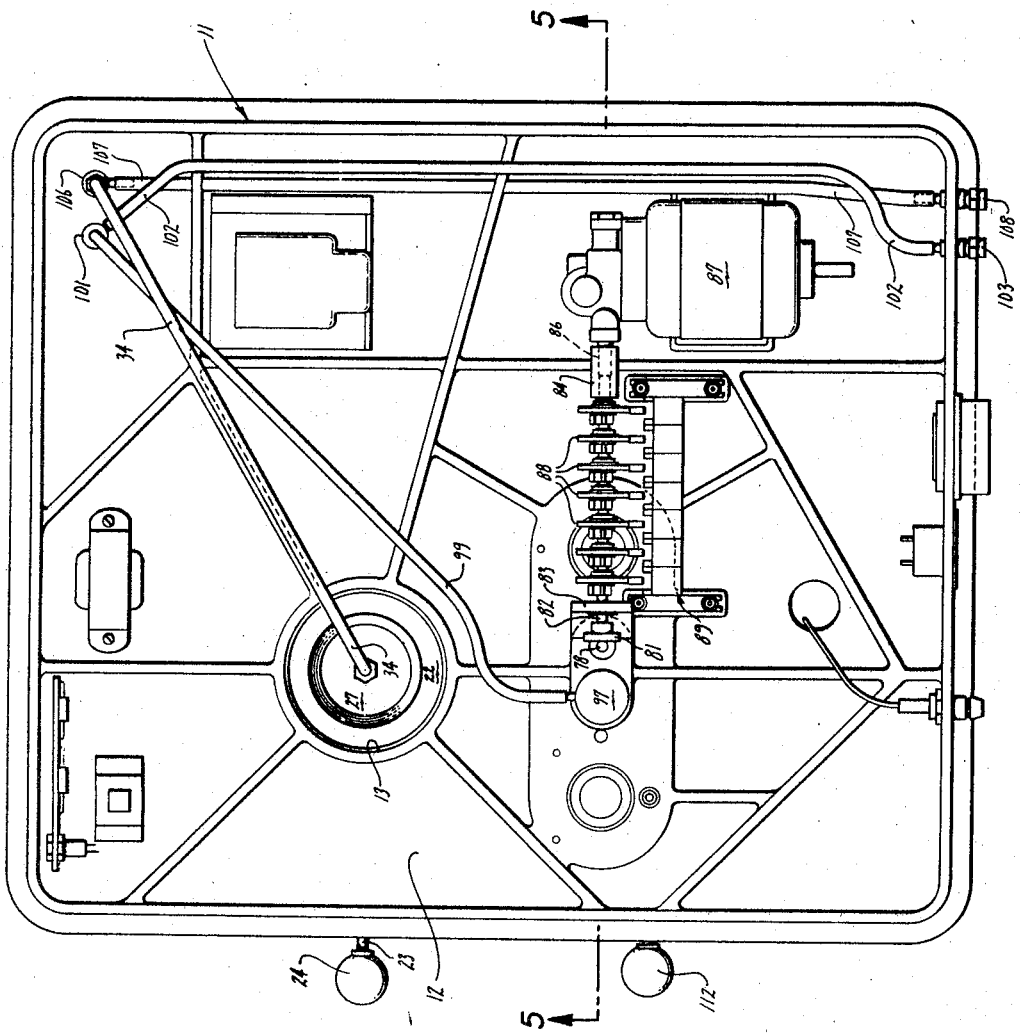
FIGURE 4 is a bottom plan view of the machine shown in FIGURE 1.

Separate drive means is provided for driving each of the movable plates 19 and 21 along the desired axes, namely plate 19 along the "Y" axis and plate 21 long the "X" axis. This means consists of a stepping motor 36 of a suitable type such as a Slo-Syn driving motor manufactured by the Superior Electric Co. of Bristol, Conn. This motor 36 is mounted upon a bearing housing 37 which is carried by a bearing and motor mount 38. The mount 38 is secured to the desired plate by suitable means such as screws 39 (see FIGURE 2). A lead screw 41 extends longitudinally of the motor mount 38 and is supported by a pair of bearings 42 and 43 within the bearing housing 37. The lead screw is connected to the output shaft 44 of the motor 36 by a coupling 46. An elongate nut 47 is threaded onto the lead screw 41. The nut 47 is provided with a central plug 48 at its extreme end which has a resilient strip 49 of suitable material such as beryllium copper secured thereto by screws (not shown). The extreme ends of the elongate strip 49 are secured to the plate which is to be moved by suitable means such as screws (not shown). An actuator member 52 is mounted on the nut 47 and is carried thereby. The actuator member 52 is adapted to engage "in" and "out" limit switches 53 and 54 of the Microswitch type for limiting the travel of the nut 47. The limit switches 53 and 54 are carried by a bar 56 which is supported upon the motor mount 38. Thus, for the "Y" axis, the limit switch 53 serves as the down limit, whereas the limit switch 54 serves as the up limit. The corresponding switch 53 for driving the "X" axis is the left limit, whereas the corresponding switch 54 for the "X" axis is the right limit. With the arrangement thus far described, it can be seen that as the motors for the "X" and "Y" axes are operated, the vacuum plate 31 will be shifted along the "X" and "Y" axes for a purpose hereinafter described. As hereinafter explained, the vacuum plate is adapted to receive the devices to be checked and sorted.

Means is provided for mounting a plurality of probing heads 61 and a marker 62 for utilization with the die carried by the chuck plate 31 and consists of a large mounting ring 63 which is provided with a large central opening 64. The ring is provided with integral bifurcated extensions 64a and 64b which are slidably mounted upon a pair of large posts 66. The posts 66 are mounted in an upright position upon flanged collars 67 secured to the top plate 12 of the base 11 by suitable means such as screws 68. The mounting ring 63 is normally urged in a downward direction by the force of gravity and, in addition, by positive loading means in the form of springs 69 mounted on the posts 66 above the extensions 64a and 64b and held in place by caps 71 secured to the upper ends of the posts 66.

Means is provided for limiting the downward travel of the mounting ring 63 and consists of a vertical stop rod 73 which is mounted in the top plate 12 and which is adapted to extend into a bore 74 provided in the mounting ring 63. A micrometer 76 is mounted in the mounting ring 63 and is provided with a rod 77 which is adjustable axially of the bore 74 and which is adapted to engage the rod 73 to limit the downward travel of the mounting ring. It can be seen that merely by adjustment of the micrometer 76, the level at which the mounting ring 63 is stopped can be readily adjusted.

Means is provided for raising the mounting ring 63 against the force of gravity and the springs 69 and consists of a vertically extending pusher rod 78 which is slidably mounted in the top plate 12 of the base 11. A cam follower 79 is mounted on the lower extremity of the rod 78. The cam follower 79 engages a cam 81 carried by a shaft 82. The shaft 82 is rotatably mounted in a bracket 83. The other end of the shaft 82 is connected by a coupling 84 to an output shaft 86 of a gear motor 87 mounted in the base 11 on the under side of the top plate 12. The shaft 82 also carries a plurality of additional cams 88 which are adapted to operate a plurality of microswitches 89 in a desired sequence. The pusher rod 78 is adapted to engage an adjustment screw 91 which is threadably mounted in a cross bar 92 for vertical adjustment. The cross bar 92 is secured to the mounting ring 63. Thus, it can be seen that as the motor 87 is operated, the pusher rod 78 will be raised and lowered by the cam 81 to raise and lower the cross bar 92 and the mounting ring 63.

Means is provided for lifting the mounting ring 63 independent of the pusher rod 78 and consists of a lift rod 96 which is raised and lowered by a piston (not shown) provided in a cylinder 97. Air under pressure is supplied to the cylinder 97 from piping 99 which is connected to one side of a control valve 101 which is mounted in the top plate 12. The other side of the control valve 101 is connected to piping 102 which is connected to a fitting 103. The fitting 103 is adapted to be connected to a suitable source of gas under pressure (not shown). Similarly, the piping 34 is connected to one side of a control valve 106 mounted in the top plate 12. The other side of the control valve 106 is connected to piping 107 that is connected to a fitting 18. The fitting 108 is adapted to be connected to a suitable source of vacuum (not shown).

Means is provided for manually raising the mounting ring 63 and consists of a rod 111 which is threaded into the block 110 and which is provided with a knob 112. Rod 115, adjustably mounted in block 110 by set screw 120, extends vertically through holes 125 and 125a in top plate 12 and base cover 203 respectively and is adapted to bear on the underside of extension flanges 63a of mounting ring 63. The rod 111 extends through a slot 113 provided in the base 11 to permit the rod 111 to be raised. The base is also provided with a horizontal slot 114 which is adapted to receive the rod 111 after it has been used to raise the mounting ring 63 to hold the mounting ring 63 in a raised position.

As can be seen from FIGURE 1, a plurality of the probing heads 61 are mounted upon the mounting ring 63. Each of the probing heads is shown in detail in FIGURES 6 and 7 and consists of a rectangular housing 116 which is provided with a bore 117 extending longitudinally of the housing which is rectangular in cross-section. A rectangular mounting block 118 is disposed within the bore 117 and it also is provided with a rectangular bore 119. A rectangular core block 121 is disposed within the bore 119 and has a cylindrical bore 122. An arm 123 is mounted in the core block 121 and extends upwardly at an angle with respect thereto. The arm is secured in the bore 122 by suitable means such as an epoxy. A head 124 is mounted on the end of the arm 123 and carries a centerless ground tungsten carbide rod 126 which is provided with a point 126a which is ground down to a suitable included angle, such as 30°, 18°, 15°, etc. The rod 126 is disposed in a groove 127 provided in the head and is held in place by screws 128. Electrical contact is made to the rod 126 by a conductor 129 secured to the head by suitable means such as screw 131. The head 124 is isolated electrically from the remainder of the machine in a suitable manner. This can be accomplished by the anodizing provided on the arm 123 and the head 124.

The core block 121 is urged upwardly toward one side by a pair of leaf springs 132 and 133 which engage the side walls forming the bore 119 in the mounting block 118. Means is provided for pivotally mounting the mounting block 118 within the bore 117 and consists of a pair of ball bearings 136 which are seated in the side walls of the mounting block 118. One of the ball bearings is carried by yieldable member 137 which is secured to the wall forming the bore 117 by suitable means such as screw 138. The other ball 136 is carried by a slide 141 mounted within the bore 117. The slide 141 is provided with an ear 142 to be used as hereinafter described. End plates 143 and 144 are mounted on the housing 116 by suitable means such as screws 146. The end plate 143 is provided with a hole 147 and the end plate 144 is providede with a hole 148. A differential screw 149 is provided which has two different threaded portions 149a and 149b. The portion 149a is threaded into the core block 121, whereas the portion 149b is threaded into the mounting block 118. In order to obtain differential movement between the core block 121 and the mounting block 118, the portions 149a and 149b have different numbers of threads per inch. By way of example, the portion 149a can have 80 threads per inch, whereas the portion 149b can have 40 threads per inch. The differential screw 149 extends out through the opening 147 and is provided with a knurled head portion 149c. It can be seen that as the screw 149 is rotated in one direction, the mounting block 118 will be advanced at a certain rate as, for example, 40 threads per inch while at the same time the block 121 will be driven backwards at a rate of 80 threads per inch. In other words, the mounting block 118 is advanced twice as fast as the core block 121 is retracted. This can be considered to provide movement of the rod or probe 126 in the "X" direction.

Means is provided for moving the block 118 to give movement in a "Y" direction to the probe 126 and consists of a screw 151 threaded into the housing 116 and engaging the mounting block 118 at a point remote from the axis extending between the ball bearings 136. The screw is provided with a knurled knob portion 151a. The mounting block 118 is spring-loaded to yieldably urge the mounting block in a direction against the screw 151 by means which consists of a spring 152 having one end engaging the mounting block 118 on the side of the pivot axis between the bearings 136 opposite that engaged by the screw 151. The other end of the spring 152 is engaged by an adjustment screw 153 threaded into the block 116. Thus, it can be seen that as the screw 151 is advanced or retracted, the probe 126 will be raised and lowered to provide movement in a "Y" direction about the pivot axis formed by the ball bearings 136.

Means is also provided for giving movement from the left to the right, or along the "Z" axis, and consists of a screw 154 threaded into the housing 116 and which is provided with a knurled knob portion 154a. The screw 154 is also of the differential type and is provided with portions 154b and 154c in which portion 154b has twice as many threads as the portion 154c. Portion 154b is threaded into the ear 152 provided on the slide 141. A spring 156 is mounted coaxially on the screw 154 and has one end engaging the plate 143 and has the other end engaging the ear 142. Similarly, as explained for screw 149, as screw 154 is advanced, it will be advanced in the block 116 twice as fast as the slide 141 is retracted by the portion 154b to provide a net advance for the slide 141.

It will be noted that the construction of the probing head 61 is such that the pivot point for the point 126a of the probe is in substantial alignment with the pivot axis formed by the ball bearings 136. It also will be noted that the probe 126 is positioned at substantially 45° angle which makes it possible for the operator to view the point at which the probe is making contact with the semiconductor device.

A plurality of the probing heads 61 are secured to the mounting ring 63 by suitable means such as screws 158. A sufficient number of the probing heads 61 is provided to provide the necessary number of probes which must make contact to the semiconductor chip being analyzed.

Figure 8:
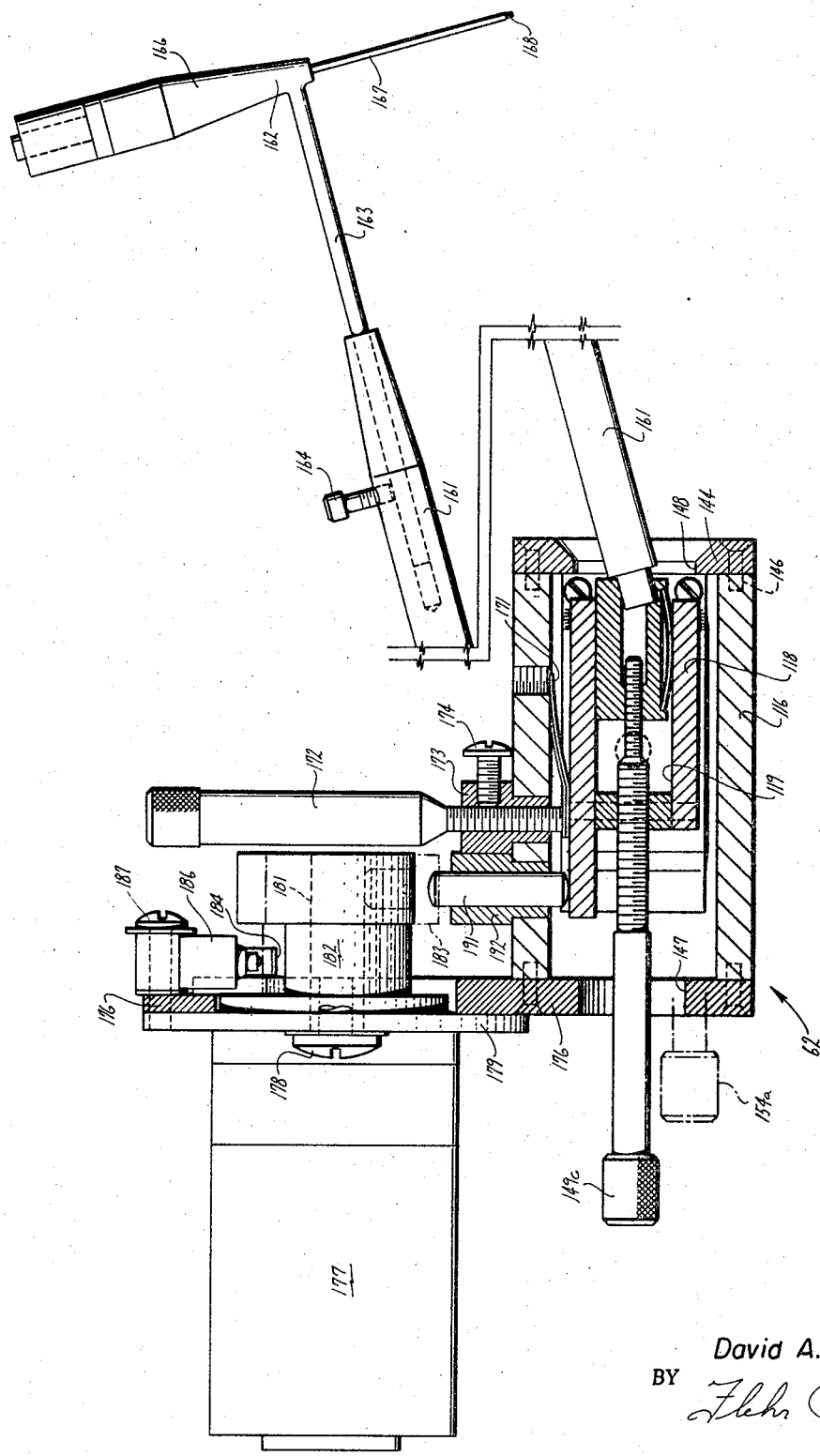
FIGURE 8 is a cross-sectional view taken along the line 8—8 of FIGURE 2 showing a motorized marker.

At least one motorized marker 62 is also secured to the mounting ring and, as shown in FIGURE 8, consists of many parts which are substantially identical to the corresponding parts of the probing head and which have been numbered appropriately. However, an arm 161 has been substituted for the arm 123 and carries an inking pen 162 which is provided with an extension 163 mounted on the arm 161 and secured therein by a screw 164. The pen 162 is provided with an ink well 166 for supplying ink to a tube 167. A valve member 168 is mounted in the tube and is adapted to engage the surface to be inked to permit ink to flow from the tube 167.

A leaf spring assembly 171 is mounted upon the mounting block 118 and yieldably engages the inner surface of the bore 117 provided in the housing 116. A micrometer screw 172 is threaded into a collar 173 mounted in the housing 116. As shown in FIGURE 8, the micrometer screw extends through the collar 173 and is adapted to engage the upper surface of the mounting block 118. A screw 174 is threaded into the collar 173 and is adapted to retain the micrometer screw 172 in a desired position.

Automatically operated means is provided for raising and lowering the inking pen 162 and consists of a plate 176 which has been substituted for the plate 143 and a DC motor 177 of a suitable type such as that manufactured by Rotamac of Inglewood, Calif., is mounted on the plate by screws 178 which extend through a flange 179 provided on the motor 177 and threaded into the plate 176. The motor 177 is provided with an output shaft 181 upon which cams 182 and 183 are mounted. Cam 182 is adapted to engage the operating lever 184 of a microswitch 186 which is secured to the plate 176 by screws 187. The other cam 183 is adapted to engage a plunger 191 slidably mounted in a collar 192 provided in the housing 116. The plunger is adapted to engage the rear end of the mounting block 118.

It can be seen that as the motor 177 is operated, the cam 183 is rotated to lower the inking pen 162 and that the inking pen is returned to its home position when the cam 182 engages the operating lever 184 of the microswitch 186 to deenergize the circuit from the motor 177.

The motor 177, the motors 36 for the "X" and "Y" axes movement of the stage assembly 16, and the motor 87 are controlled from a control console or cabinet 201 which is mounted upon a pedestal 202 mounted on the top plate 12 of the base 11. A large cover 203 is mounted over the top plate 12 and serves to enclose certain of the working parts of the apparatus and, in particular, the "X" and "Y" axes stepping motors 36. The cover is provided with an accept button 204 and a plurality of reject buttons 206 which are numbered 1–6. Horizontal jog and scan buttons 207 and 208 are also provided on the cover. Similarly, vertical jog and scan buttons 209 and 211 are also mounted on the cover.

A microscope 213 of a conventional type is mounted on a large pin 214 which is then mounted in a hole 215 in the pedestal 202 and is secured therein by a screw 216.

The control console or cabinet contains a horizontal index section 221 and a vertical index section 222. Each of the sections is substantially identical and includes a counter 223, an index button 224, an on-off switch 226, a fuse 227, and a power on indicator light 228. The control console 201 also includes an upper section 231 which includes a sequence control knob 232, master lock-out control 234, an on-off switch 236, an automatic cycle on lamp 237, an automatic cycle start pushbutton 238, a probe lower pushbutton 239, fuses 241, move left indicator light 242, pushbutton 243, pattern index pushbutton 244, move right indicator light 246 and pushbutton 247, move down indicator light 248 and pushbutton 249, row index pushbutton 251, move up light 252 and pushbutton 253, probing mode selector switch 254, pattern index mode selector switch 256, row index mode selector switch 257, and illumination mode selector switch 258. It also includes pushbuttons 259. The circuitry utilized in the sections 221 and 222 can be of the type manufactured and sold by the Superior Electric Co. of Bristol, Conn., and which supplies output pulses for driving the stepping motors 36. The other circuitry provided in the cabinet 201 can be of any desired type to provide the functions desired and for that reason will not be described in detail.

Operation of the automatic die sort machine in performing my method may now be briefly described as follows. Let it be assumed that a wafer having a pattern formed from integrated circuitry or from a plurality of semiconductor devices is to be checked. The wafer is first placed upon the chuck assembly 26 and the vacuum is applied by operation of the vacuum switch 106 to supply vacuum to the chuck assembly 26 and to retain the wafer on the chuck plate 31.

After the wafer has been positioned, it is necessary to determine the axis of the wafer and to align it so that it is coincident with the axis of the motion of the machine. First, the scan button is operated to scan from one side of the wafer to the other at high speed to determine the relationship between the patterns to a fixed point on the pattern. If it is necessary, the chuck assembly 26 is rotated by releasing the screw 23 and rotating the chuck assembly to the desired angular position and then locking the screw 23 in place. Thereafter, the jog buttons 207 and 209 can be utilized during the initial line-up to bring the probe points into proper relationship with the individual patterns on the wafer. By way of example, each depression of the jog button can advance the stage by one-half of a thousandth of an inch. It should be appreciated that the horizontal and vertical movements for the stage assembly 16 are independent of each other and make it possible to step rectangular patterns.

After the wafer has been properly aligned, the probing heads 61 are individually adjusted on their X, Y and Z axes so that their probing points 126a are in registration with the pattern to be probed. This is accomplished by adjusting the knobs 149c, 154a and 151a while examining the pattern under the microscope 213 and the probe points 126a.

After this has been accomplished, the machine is set up to operate automatically to program movement of the vacuum chuck assembly 26 in incremental steps. The distance of the incremental steps corresponds to the distance between patterns and is set up on the control console 201 and corresponds to the distance between patterns so that with each incremental step, a different pattern is probed. The probing of the pattern is accomplished by operation of the motor 87 and through the cam 81 raises and lowers the pusher rod 78 which, in turn, raises the mounting ring 63 with the probing head 61 and the marker carried thereon against the force of the springs 69. During the time that the mounting ring is being raised, the stage assembly 16 is operated by the stepping motors 36 to position the next pattern between the probing heads. Thereafter, the pusher rod is permitted to lower and the mounting ring 63 is pushed downwardly by the springs 69 to again move the probing points 126a into engagement with the pattern.

It should be pointed out that during the time that the probing points are in contact with the pattern, appropriate conductors can lead from the probing points to the test set which can determine the electrical parameters of the integrated circuit or devices being tested. Thus, it is possible to determine whether or not the pattern is a usable one or whether it should be rejected. In the case of a reject pattern, one of the reject buttons 206 is operated to cause operation of the motorized marker 62. This is accomplished by energization of the motor 177 which causes operation of the cam 183 to permit the marking pen 162 to be lowered into engagement with the wafer to place an ink mark on the wafer adjacent the and the motor 177 is deenergized by the cam 182 operating the operating lever 184.

Thereafter, as is well known to those skilled in the art, the wafer is cut into individual dice and the operator merely sorts out the dice with the ink marks thereon to eliminate the rejects.

In operation, the probing heads in one embodiment of the machine are stepped across the wafer, then down, and reversed, and then stepped across and down, and so forth, until all the patterns on the wafer have been completely checked. Thus, it can be seen that once the probe points have been positioned over the pattern configuration, the machine will automatically check the wafer. After the wafer has been checked, the vacuum valve 106 can be operated to release the wafer and then another wafer can be placed in the machine and the same sequence of operations completed.

By way of example, one machine incorporating the present invention was able to test and classify transistors and microcircuit devices at the rate of 2000 units per hour. One of the principal advantages of the machine is that relatively unskilled personnel can be utilized for operating the machine and one operator can operate as many as four different machines. The stepping distance was adjustable from .0005 inch to .9995 inch in .0005 inch increments. The stepping distance could be varied by dial adjustment in both the "X" and "Y" axes. Testing was obtained down to .001 inch square with an indexing accuracy of .0001 inch of over one inch (non-cumulative). The ring assembly accommodated any combination of probing heads and/or markers up to a combined total of 18.

When a plurality of markers are utilized, additional classification can be provided as indicated by the six reject buttons. Thus, in the embodiment shown, six different markers can be provided, each utilizing a different colored ink.

Although in the embodiment of the machine herein described, the mounting ring 63 carrying the probing heads and marker was shifted and the wafer was held stationary, it should be appreciated that, if desired, the probing heads and marker could remain stationary and the stage assembly 26 carrying the wafer could be shifted.

It is apparent from the foregoing that a wafer die sort machine has been provided which has many desirable features. It can be readily and economically manufactured. It is also relatively compact with all of the controls readily accessible to the operator.

I claim:

1. In a machine of the character described for checking a wafer by sequentially engaging spaced patterns on a wafer, a chuck assembly for holding the wafer to be checked, means for mounting said chuck assembly, a plurality of probing heads having probe points adapted to contact the pattern on the wafer, means for mounting the probing heads, automatically operated motorized stepping means for causing relative movement between said chuck assembly and said means for mounting said probing heads to shift the same in first and second directions in successive increments and motive means for causing relative movement between said chuck assembly and said means for mounting said probing heads in a third direction whereby successive patterns on the wafer are engaged automatically in a predetermined sequence solely by operation of said automatically operated motorized stepping means and said motive means.

2. A machine as in claim 1 wherein said means for causing relative movement includes a stage assembly, said chuck assembly being mounted on said stage assembly, said motorized stepping means including a pair of stepping motors connected to said stage assembly for moving the chuck assembly carried by the stage assembly in said first and second named directions.

3. A machine as in claim 2 wherein said means for causing relative movement in said third direction consists of a motor and cam means driven by the motor for raising and lowering the probing heads.

4. A machine as in claim 1 wherein said means for mounting said probing heads consists of a ring and means for securing said probing heads to said rings, together with a marker and means for securing said marker to said ring.

5. A machine as in claim 1 wherein each of said probing heads includes a housing mounted on the ring and means mounted in the housing for shifting the probe point in X, Y and Z directions, said means for shifting including a manually operable knob for each of said X, Y and Z directions.

6. A machine as in claim 1 wherein each of said probing heads includes a housing having a bore therein, a mounting block disposed in the bore, said mounting block having a bore therein, means pivotally mounting said mounting block in said housing for movement about a pivot axis, a core block mounted in the bore in said mounting block, means for mounting said probe point on said core block, adjustment screw means for shifting said core block axially of the bore in the mounting block for movement in the X direction, means for pivoting said mounting block about said pivot axis for movement in the Z direction, and means mounted in said housing and engaging said means forming a pivot axis for said mounting black to shift the angular position of said pivot axis to provide movement in a Y direction.

7. A machine as in claim 6 wherein said means for causing movement of the mounting block about the pivot axis consists of an adjustment screw threaded into the housing and engaging the mounting block on one side of the pivot axis and yieldable means supported by the housing and engaging the mounting block on the other side of the pivot axis and yieldably urging the other end of the mounting block toward the screw.

8. A machine as in claim 6 wherein said means for causing angular movement of the pivotal axis includes a slide member mounted in the housing, a screw threaded into the housing and engaging the slide member, and pivot means carried by the slide member and engaging the mounting block.

9. A machine as in claim 2 wherein said marker includes a marking instrument, a housing means mounted in the housing for supporting the marking instrument and for moving the marking instrument along X, Y and Z axes, said means for moving the marking instrument including a manually operable knob for each of said X, Y and Z axes, and means for raising and lowering the marking instrument relative to the wafer.

10. A machine as in claim 9 wherein said means for moving said marking instrument along X, Y and Z directions consists of a housing having a bore therein, a mounting block disposed in the bore in the housing and having a bore therein, a core block disposed in the bore in the mounting block, means pivotally mounting the mounting block within the housing, screw means threaded into the mounting block and engaging the core block for moving the core block longitudinally of the bore in the mounting block to provide movement in the X direction, means mounted in the housing for causing pivotal movement of the mounting block about the pivot axis to provide movement in the Z direction, and means mounted in the housing for shifting the pivot axis to provide movement in the Y direction, and means for mounting the marking instrument on the core block.

11. A machine as in claim 10 together with a motor mounted on said housing, cam means driven by the motor for moving the marking instrument downwardly, and additional cam means operated by the motor for deenergizing the motor after the marking instrument has been raised.

12. In a machine of the character described for checking a wafer having a plurality of spaced patterns, a base, a stage assembly mounted upon the base, a chuck assembly mounted on the stage assembly, said stage assembly including means for moving said chuck assembly in X and Y directions, motorized stepping means mounted in the base and engaging the stage assembly for moving said stage assembly to provide movement in said X and Y directions, said chuck assembly being adapted to carry a wafer to be checked, a mounting ring overlying the chuck assembly, a plurality of probing heads carried by the mounting ring, each of the probing heads carrying a probe point adapted to contact the pattern on the wafer, means for causing relative automatic vertical movement between the mounting ring and the probing heads carried thereby and the chuck assembly in synchronism with the movement of the chuck assembly in the X and Y directions whereby successive patterns on the wafer are engaged automatically in a predetermined sequence solely by operation of the motorized stepping means and the means for causing automatic vertical movement.

13. A machine as in claim 12 together with a control console containing the electronics for said means for causing automatic vertical movement and a microscope supported upon the base and being positioned to permit viewing of the wafer carried by the chuck assembly.

14. A machine as in claim 12 together with means for limiting the downward travel of the mounting ring.

15. A machine as in claim 12 together with air operated means for raising the mounting ring and the probing heads carried thereby to an out-of-the-way position.

16. A machine as in claim 12 together with at least one marker assembly carried by the mounting ring.

17. In a machine for checking wafers, a base, a chuck assembly for holding a wafer to be checked, a mounting member, a plurality of probing heads mounted on said mounting member and having probe points adapted to contact the wafer, and means mounted on said base for causing relative movement between said chuck assembly and said mounting member so that successive areas on said wafer can be checked, said last named means including a stage assembly having first and second plates, one of said plates being movable along an X axis and the other of said plates being movable along a Y axis, a threaded member mounted on each of said plates, a cooperating threaded member for each of the said plates engaging the threaded member mounted on said plate, first and second stepping motors mounted on said base, and means connecting said cooperating threaded member with a stepping motor so that the first stepping motor drives the plate movable on the X axis and the second stepping motor moves the plate movable on the Y axis, means mounted on said base and connected to said mounting member and said chuck assembly for causing relative movement along a Z axis so that said probe points are moved into and out of contact with said wafer, said last named means including a third motor, and a control console for controlling said first, second and third motors to cause said probe points to engage successive areas on said wafer by successively moving said probe points out of contact with said wafer and causing relative movement along the X and Y axes between said probe points and said wafer to the next area of the wafer and then moving the probe points into contact with the wafer.

18. A machine as in claim 17 wherein said wafer is provided with a plurality of rows of successive areas to be checked and wherein said control console includes means for causing said machine to sequentially check the areas in each row and then to advance to the next succeeding row until all the areas on the wafer have been checked.

19. A machine as in claim 18 together with a marking member mounted on said mounting member for marking selected areas on said wafer.

(References on following page)

References Cited

UNITED STATES PATENTS

| | | | |
|---|---|---|---|
| 1,800,209 | 4/1931 | Christopherson | 350—81 X |
| 3,134,942 | 5/1964 | Rhodes. | |
| 3,185,927 | 5/1965 | Margulis et al. | 324—158 |
| 3,270,423 | 9/1966 | Birrell et al. | |
| 3,333,274 | 7/1967 | Forcier | 350—900 X |
| 3,345,567 | 10/1967 | Turner | 324—158 |

FOREIGN PATENTS 572,506  3/1959  Canada.

RUDOLPH V. ROLINEC, *Primary Examiner.*

E. L. STOLARUN, *Assistant Examiner.*

U.S. Cl. X.R.

269—21; 324—72.5